(12) United States Patent
Barnhurst

(10) Patent No.: US 6,715,884 B2
(45) Date of Patent: Apr. 6, 2004

(54) VISIBLE LIGHT MODIFIER AND METHOD

(76) Inventor: Jeffrey E. Barnhurst, 919 Blue Arroyo Dr., Henderson, NV (US) 89015

( * ) Notice: Subject to any disclaimer, the term of this patent is extended or adjusted under 35 U.S.C. 154(b) by 39 days.

(21) Appl. No.: 10/270,466

(22) Filed: Oct. 15, 2002

(65) Prior Publication Data

US 2003/0081183 A1 May 1, 2003

Related U.S. Application Data

(63) Continuation-in-part of application No. 09/962,670, filed on Sep. 26, 2001, now abandoned.

(51) Int. Cl.7 .............................................. G03B 21/14
(52) U.S. Cl. ............................ 353/46; 359/228; 353/98
(58) Field of Search ..................... 353/1, 2, 46, 98; 359/228, 616, 617; 362/84, 96, 101, 318; 446/267; 472/61, 67

(56) References Cited

U.S. PATENT DOCUMENTS

| 3,843,244 A | * | 10/1974 | Facchini | 353/2 |
| 5,132,844 A | * | 7/1992 | Sharp, Jr. | 359/617 |
| 5,683,174 A | * | 11/1997 | Lena, Jr. | 362/318 |
| 5,951,405 A | * | 9/1999 | Eigenmann | 472/61 |
| 6,015,216 A | * | 1/2000 | Nakamura | 362/96 |

* cited by examiner

*Primary Examiner*—William Dowling
(74) *Attorney, Agent, or Firm*—Andrew M. Harris; Harry M. Weiss; Weiss, Moy & Harris, P.C.

(57) ABSTRACT

A visible light modifier and method provide a new visual display. A projection is generated by the visible light modifier that includes a monochromatic or chromatically separated light beam having variations generating a stunning visual display. The display may be used in advertising, entertainment, psychotherapy and anywhere that attention-getting or mood-altering visual displays are desired. The visible light modifier includes a fluid refractive medium within a container and a a mirror positioned within the fluid refracting medium at a predetermined angle so that for multi-chromatic sources an angular chromatic separation is achieved in a beam reflected from the reflective surface through the refractive medium, or for monochromatic sources, a projected beam having a shape variance is achieved. Motion of the fluid generates variations in the shape and/or chromatic distribution within the reflected beam, which can be projected on a screen or other suitable background.

25 Claims, 3 Drawing Sheets

VISIBLE LIGHT MODIFIER AND METHOD

RELATED APPLICATIONS

The present application is a continuation-in-part of U.S. patent application entitled "VISIBLE LIGHT MODIFIER AND METHOD" Ser. No. 09/962,670 filed on Sep. 26, 2001, now abandoned from which it claims priority.

BACKGROUND OF THE INVENTION

1. Field of the Invention

The present invention relates generally to visible lighting systems, and more specifically, to a projection device for generating visual displays.

2. Background of the Invention

Visible light displays are in use in a multitude of applications. Laser displays are used for entertainment, advertising, education and anywhere that an attention-getting display is desired. In home use, devices such as "Lava Lamps" and small laser or pseudo-laser halogen lamp-based devices provide entertaining displays that may be synchronized to music, enhancing their effect.

Part of the value of the above-mentioned displays lies in the motion of the light, which is generally protected on a screen or other background. The motion of the light provides an effect that may be soothing (slow, curved paths) or stimulating (fast, sharp paths).

As with most entertainment devices, the existing displays mentioned above, now in use for a considerable period of time, have been seen by many people and their "newness" has passed. Also, unless considerable effort is expended in programming a laser or similar visual light display, the variety generated by the display will be exhausted by an audience after a reasonably short period of time.

Therefore, it is always desirable to provide a new visible light display that can capture the attention of an audience. It is further desirable to provide a visible light display capable of variations in the visible light that do not require extensive programming to maintain variety.

SUMMARY OF THE INVENTION

The above objective of providing a new visible light display that does not require extensive programming is accomplished by a visible light modifier and method. The visible light modifier includes an illumination source, a container partially filled with a fluid refracting medium, and a directing mirror disposed within the fluid refracting medium and positioned at a predetermined angle with respect to the average surface of said fluid refracting medium.

In another embodiment of the invention, illumination source may be a monochromatic source (e.g., a laser), in which case the reflecting mirror projects a beam having patterns generated by passage through the fluid refracting medium and variations generated by motion of the fluid refracting medium. The illumination source alternatively may be multi-chromatic, in which case a projected beam having a separated spectral characteristic is refracted and reflected out of the fluid refracting medium to provide a projected image having an angular distribution of colors that varies due to motion of the fluid refracting medium.

Lenses may be included to further modify the variations in the projected beam and image masks may be used to provide a background image for the color variations. The fluid may be stimulated by external mechanical means, or the visible light modifier may include a mechanical stimulator. Lenses may be mechanically rotated and translated to produce additional variations creating interesting visual displays.

The foregoing and other objectives, features, and advantages of the invention will be apparent from the following, more particular, description of the preferred embodiment of the invention, as illustrated in the accompanying drawings.

DETAILED DESCRIPTION OF THE EMBODIMENTS

Figure 1:
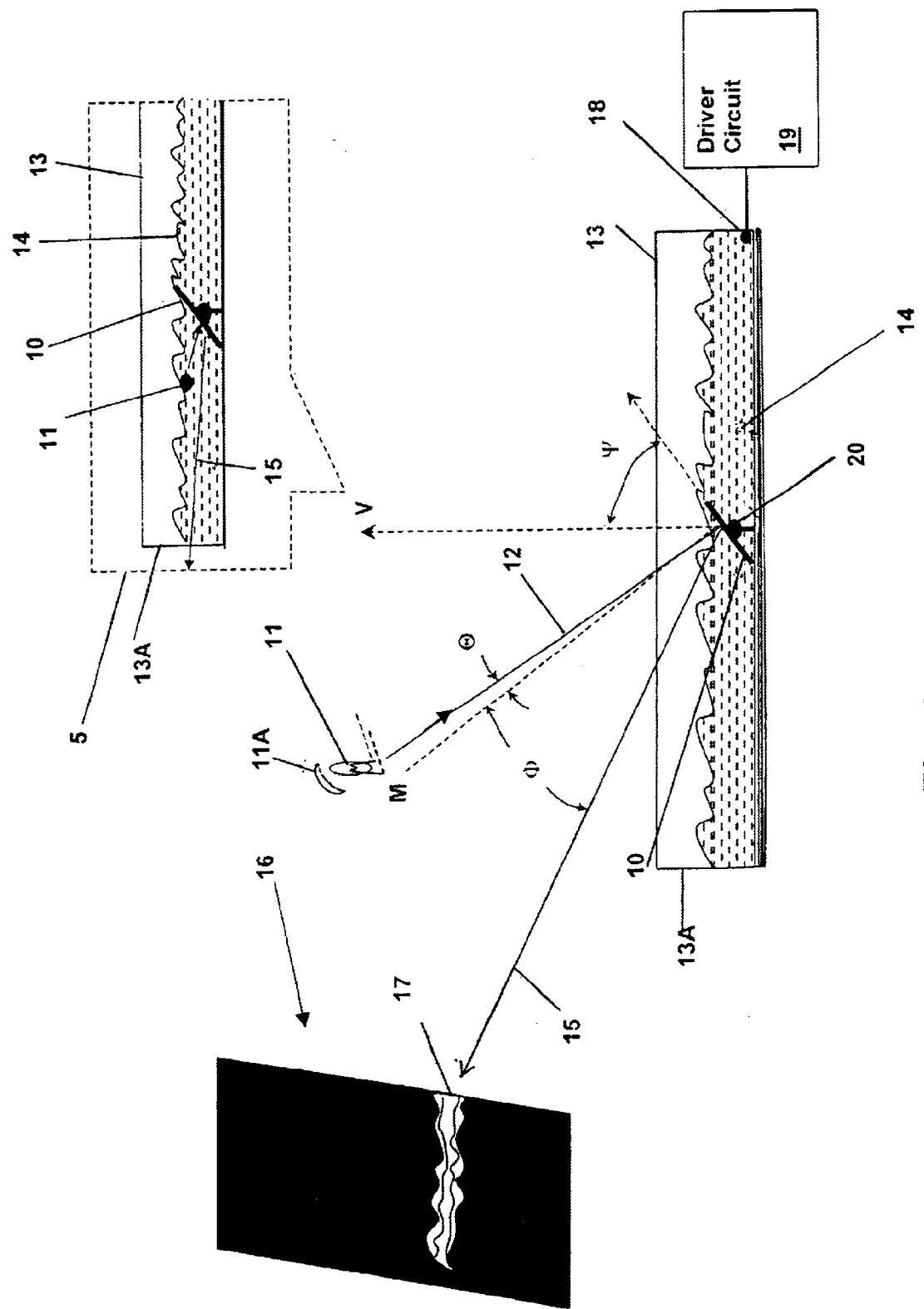
FIG. 1 is a pictorial diagram depicting a visible light modifier in accordance with a first embodiment of the present invention.

Referring now to the figures and in particular to FIG. 1, a visible light modifier in accordance with a first embodiment of the present invention is shown. An illumination source 11 is used to generate a source of visible light having a broad chromatic spectrum or a monochromatic spectrum. Sources such as halogen lamps are especially suitable for use in the visible light modifier of the present invention, as the have a high intensity level and a broad spectrum output. Krypton and Xenon lamps are other suitable illumination sources. Monochromatic sources include lasers and the above-listed lamps with an additional filter, such as a gel plate.

The illumination sources used in the present invention can include parabolic reflectors 11A for focusing an illumination beam. An illumination beam 12 from illumination source 11 enters the top surface of a container 13 that may have an open top, a transparent top, or a top with sufficient transparent area for the introduction of illumination beam 12. Container 13 contains a fluid refracting medium 14, which is generally water, but may be another fluid as described below. If container 13 is sealed, sufficient air must be present for motion of fluid refracting medium 14 to occur, unless fluid refracting medium 14 is a mixture as described below. The apparatus can be further packaged by placing illumination source 11 within container 13, either above or below the surface of fluid refracting medium 14, as illustrated in detail 5 of FIG. 1.

Illumination beam 12 enters fluid refractive medium 14 which is disposed within container 13, is refracted by fluid refractive medium 14 and then is reflected from a mirror 10 that is immersed or at least partially immersed within fluid refractive medium 14. To achieve the angular color separation for multi-spectral illumination sources, the angle of incidence $\Theta$ between illumination beam 12 and a normal M to plane of mirror 10 surface must be non-zero, or the angular separation of color will not be achieved. Angle $\Theta$ depends on many factors, including the refractive index of fluid refractive medium 14, angle $\Psi$ between the plane of mirror 10 and the normal V to the (average) surface of fluid refractive medium 14. The reflected beam is further refracted by fluid refractive medium 14 and exits container 13, from the top surface of fluid refractive medium 14 or optionally through a transparent side 13A of container 13.

Mirror 10 may be other than a planar mirror, e.g., parabolic or spherical mirror, which will also affect the angle Θ for generating images consistent with the operation of the present invention. Mirror 10 may also be replaced by a "mirror ball" or a multi-faceted mirror, in which case the angular chromatic separation may be present on only one or a few of the mirror facets at a time, while generating other non-separated projections. A useful way to fabricate a multifaceted mirror is to attach an adhesive backed paper or other substrate to a plane mirror, then shatter and conform the substrate to a desired shape.

Experimental results have been obtained showing the best imaging performance for angle Ψ between 30 and 50 degrees adjusted by a tiltable mirror mount 20, which provides tilt of mirror 10 with respect to normal V. Projected beam 15 has an angle Φ determined by angles Ψ and Θ, and Ψ is generally adjusted to position projected beam 15. Thus the apparatus described provides a mechanism for positioning projected beam 15 so that the generated image 17 appears on a projection screen 16 or other suitable display background such as a wall, building, billboard, etc.

Fluid refractive medium 14 may be water or another suitable fluid having a refractive index differing from air, or may be a combination of fluids that generate an effect created by local variations of a mixture within container 13.

A projection 17 generated from said projected beam 15 has chromatic characteristics that are created by an angular separation of illumination beam 12 by interaction with fluid refractive medium 14. When fluid refractive medium 14 is motionless, projection 17 will include bands of light of differing color corresponding to the visible spectrum, similar to a rainbow pattern. However, when fluid refractive medium is in motion, projection 17 has a wildly varying color characteristic and shape that provide an entertaining, attention-getting or otherwise mood-altering visual display.

Many optical effects are present within the visible light modifier that generate projection 17 and a complete analysis is not necessary to construct a visible light modifier. Fluid refractive medium 14 and reflective surface 10 refract, diffract (at the surface), multiply-reflect internally and in some cases resonate with a particular color at a particular depth created by the instantaneous shape of the surface of fluid refractive medium 14.

In an alternative embodiment of the invention, illumination source 11 may be monochromatic, such as a laser illuminator. In the monochromatic case, there is no illumination spectrum to separate, but the non-horizontal and adjustable positioning of mirror 10 provides a projected illumination as described above for the multi-chromatic case that may be used to produce patterns having a shape similar to those generated by the above-described apparatus, but a single color characteristic. The operation of a monochromatic embodiment consistent with the apparatus of FIG. 1 differs from the operation of the device described in U.S. Pat. No. 5,951,405 issued to Eigenmann, as the patterns generated by the Eigenmann's device are generated in a direction determined only by the instantaneous position of the water surface, much as reflections appear in a room having an indoor lighted swimming pool. In contrast, the present invention provides a projective system that is controlled to direct an image to (and project the image) on a screen.

The above comparison relates to only the monochromatic embodiments of the present invention, as the angular separation of color of the present invention is not intended to occur and does not occur in the apparatus of Eigenmann.

Motion of the surface of fluid refractive medium 14 may be generated in a number of ways. Depicted in the illustration, a transducer 18 may be placed within container 13 so that container 13 or fluid refractive medium can be mechanically disturbed. A driver circuit 19 is coupled to transducer 18 and includes an input that can be coupled to an audio signal, waveform generator, or other suitable source of an electronic signal. Driver circuit may be unnecessary in the case of a transducer 18 coupled to an output of an audio amplifier, and transducer 18 is not required for audio responsive vibration within fluid refractive medium, as container 13 may be placed on or in front of an audio loudspeaker, and the resulting acoustic coupling will generate sufficient motion within fluid refractive medium 14 to vary the characteristics of projection 17. A mechanical system may also be used to mechanically stimulate fluid refractive medium 14, such as a wound spring system, or an oscillatory system.

Figure 2:
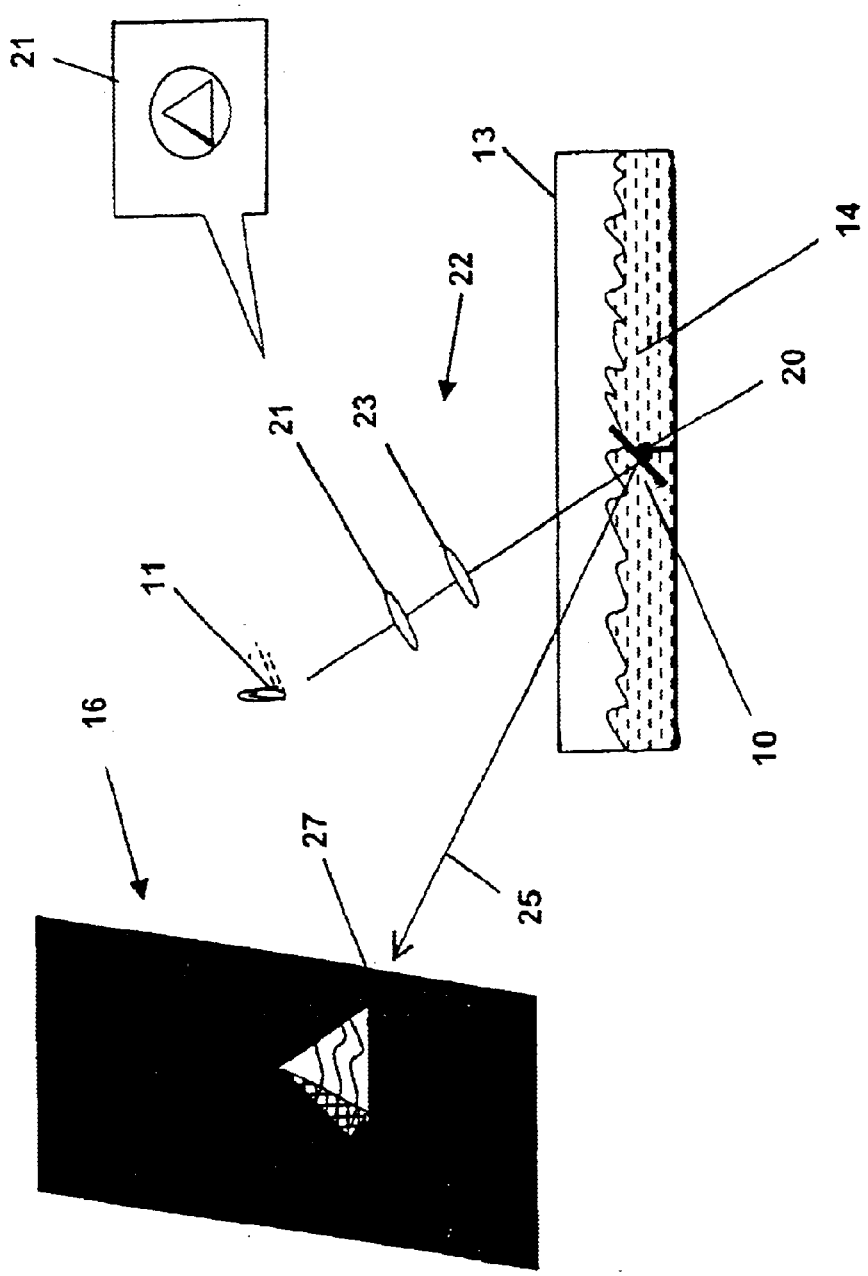
FIG. 2 is a pictorial diagram depicting a visible light modifier in accordance with a second embodiment of the present invention.

Referring now to FIG. 2 a visible light modifier in accordance with a second embodiment of the present invention is shown. In the second embodiment, an image is generated within a projection 27, by including an image mask 21. Image mask 21 is a convex—convex lens with an imaged etched on a surface of or within the lens, but other masks such as stencil masks or gels may also be used. Illumination beam 22 contains an inverted image corresponding to the pattern etched on or within image mask 21, so a second lens 23 is introduced within the path of illumination beam 22 to rectify the image (second lens 23 could alternatively be introduced in the path of reflected beam 25).

Fluid refractive medium 14 and mirror 10 generate a projected beam 25 similar to that described for the first embodiment, but the image provided by image mask 21 has been introduced with projected beam 25 so that projection 27 is in the shape provided by image mask 21 and having chromatic variations provided by motion of fluid refractive medium 14. A three-dimensional image effect is thereby generated by the visible light modifier, due to the variation of the chromatic distribution over the image. Visible light modifiers in accordance with the second embodiment of the invention are particularly useful in billboard displays or for generating motion-picture effects, as images may be combined with a dazzling chromatic distribution which captures the attention of viewers.

In an alternative embodiment, a monochromatic source may again be substituted for illumination source 11 in the apparatus of FIG. 2, yielding a monochromatic varying pattern that is further modified by image mask 21, yielding a projeced monochromatic image with the shape contained in image mask 21.

Figure 3:
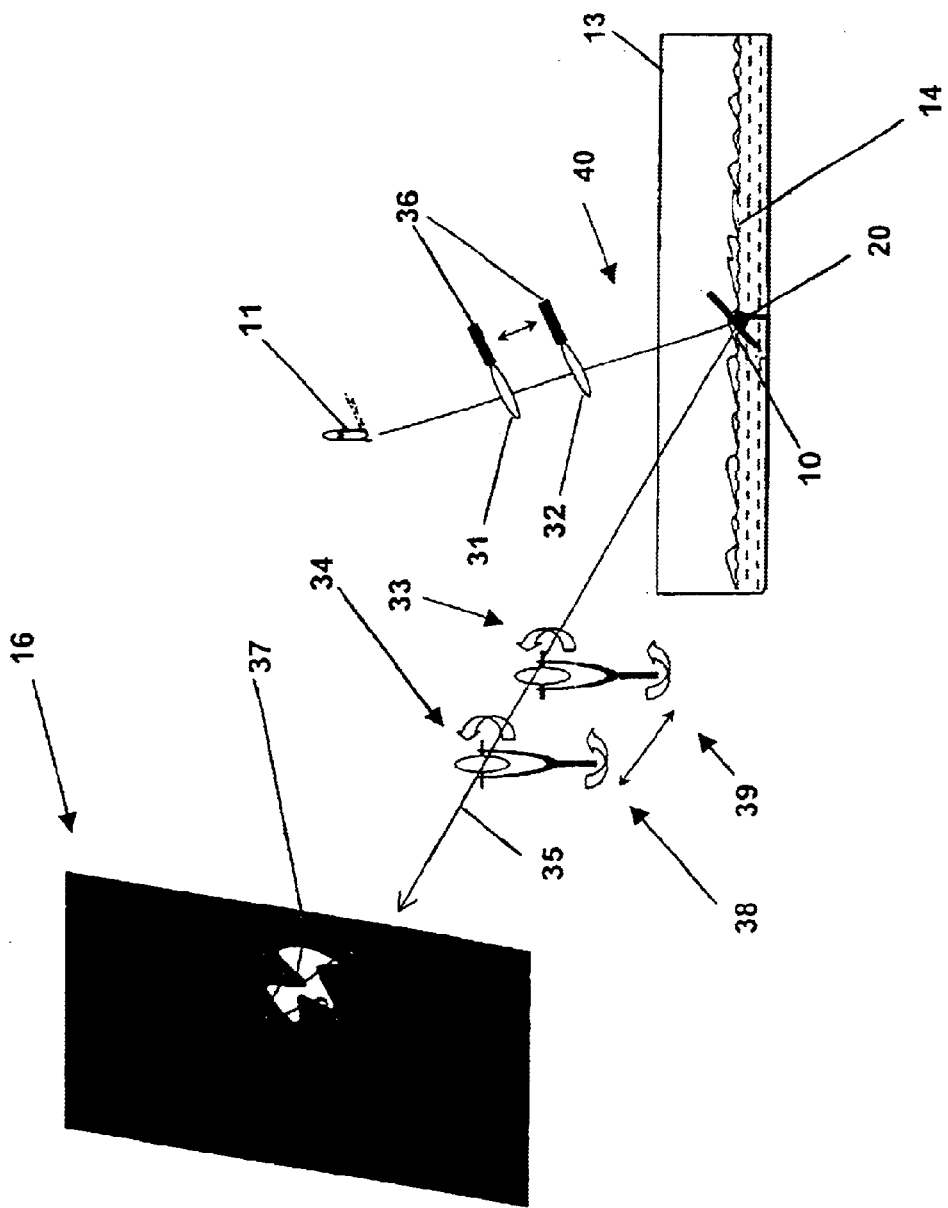
FIG. 3 is a pictorial diagram depicting a visible light modifier in accordance with a third embodiment of the present invention.

Referring now to FIG. 3, a visible light modifier in accordance with a third embodiment of the invention is depicted. As described for the first and second embodiments, a fluid refractive medium 14 and reflective surface 10 provide a chromatic variation in a projected beam 35 generated by motion of fluid refractive medium 14. In the third embodiment, lenses are introduced within the path of an illumination beam 40, projected beam 35 or both, to provide a variation of a projection 37 produced by projected beam 35. In the path of illumination beam 40, a first lens 31 and a second lens 32 are introduced that concentrate light from illumination source 11. Both lenses are convex—convex in this example, but other combinations may be used. Mount 36 provides for translational motion of lenses 31 and 32, and in practice, lens 31 will generally be fixed in position and lenses 32 will move linearly along the focal axis of lenses 31 and 32 providing adjustment of the beam shape (width).

Mount 36 may be manually adjustable, via a crank or other device, or may be electro-mechanically movable similarly to the tranducer induced motion of fluid refractive medium 14 described above for the first embodiment (Transducer induced motion of fluid refractive medium 14 may be used in combination with electro-mechanical motion of lenses in the third embodiment).

A second pair of lenses 38 and 39 are introduced along the path of projected beam 35. Mounts 38 and 39 for this second pair of lenses are more complex and provide for motion of the lenses both translationally along the focal axis and rotationally at the base of the lens mounts, varying the location of the center of projected beam 35 with respect to lenses 38 and 39, causing projected beam to pass through varying areas of thickness of lenses 38 and 39, moving projection 37 and distorting its shape. Another motional axis of lenses 38 and 39 is in the plane normal to projected beam 35 and follows an elliptical path. The elliptical motion provides a second variation of the centers of lenses 38 and 39 with respect to projected beam 35, altering the resulting projection 37 altering its shape and chromatic distribution. The projection 37 produced by the third embodiment of the invention can be described as a "color plasma" effect and may be projected on a projection screen 16 or is also suitable for use with fog machines or other media having suspended particles, generating a three-dimensional spatial effect where the beam can be seen travelling through a room.

In an alternative embodiment, a monochromatic source may again be substituted for illumination source 11 in the apparatus of FIG. 3, yielding a monochromatic varying pattern that is further modified by passing through varying areas of thickness of lenses 38 and 39 and/or lenses 31 and 32, moving projection 37 and distorting its shape.

Fog machines or equivalents may be used with any of the above-described embodiments, and in addition to the embodiments mentioned above, other combinations of portions of the above embodiments may be combined. For example, image mask 21 may be used with the lens systems of the third embodiment, either pair of lenses alone may be used in the third embodiment, and lenses or image masks depicted as located within the projected or illumination beam may be used in the path of the alternative beam. The above variations may produce differing effects or similar effects and are contemplated by the present invention, with the fluid refractive medium and reflective surface being the common elements.

While the artificial illumination sources mentioned above are suitable for use in all of the visible light modifier embodiments, natural light sources may also be used and should be considered as suitable illumination sources.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A visible light modifier, comprising:
   an illumination source;
   a container;
   a fluid refracting medium disposed within said container; and
   a reflective surface disposed within said fluid refracting medium and positioned at a predetermined non-zero angle with respect to an average surface of said fluid refracting medium, whereby a projection beam is reflected from within said container and directed toward a specific projection location, wherein said projection beam has a varying pattern generated by motion of said fluid refracting medium.

2. The visible light modifier of claim 1, wherein said illumination source is a multi-chromatic source positioned at a second predetermined non-zero angle with respect to a normal to said reflective surface, wherein said second predetermined non-zero angle is an angle for which an angular chromatic separation of light occurs through said fluid refracting medium, whereby said projection beam has a varying chromatic pattern generated by motion of said fluid refracting medium.

3. The visible light modifier of claim 1, further comprising:
   a transducer mechanically coupled to said fluid refracting medium for generating said motion; and
   a driver circuit electrically coupled to said transducer for moving said transducer, whereby said variation of said chromatic pattern is generated in conformity with an input of said driver circuit.

4. The visible light modifier of claim 1, further comprising a mechanical motion generator for generating said motion.

5. The visible light modifier of claim 1, wherein said illumination source is disposed within said container.

6. The visible light modifier of claim 5, wherein said illumination source is disposed within said fluid refractive medium.

7. The visible light modifier of claim 1, wherein said illumination source is a halogen lamp.

8. The visible light modifier of claim 1, wherein said illumination source is a laser.

9. The visible light modifier of claim 1, further comprising an image mask disposed between said illumination source and said container within a path of said illumination beam, whereby a background of said projection is generated.

10. The visible light modifier of claim 9, further comprising an image correction lens within a path of said illumination beam for inverting an image of said image mask.

11. The visible light modifier of claim 10, wherein said image mask is a lens having an image etched on a surface.

12. The visible light modifier of claim 1, further comprising a first lens and a second lens disposed along a path of said illumination beam.

13. The visible light modifier of claim 12, further comprising a translation mount mechanically coupled to said second lens for moving a focal point of said second lens along a focal axis of said first lens.

14. The visible light modifier of claim 12, further comprising a third lens and a fourth lens disposed along a path of said projected beam.

15. The visible light modifier of claim 14, further comprising a translation mount mechanically coupled to said third lens for moving a focal point of said third lens along a focal axis of said fourth lens.

16. The visible light modifier of claim 15, further comprising:
   a first rotation mount mechanically coupled to said third lens for rotating said third lens along a first axis perpendicular to a focal axis of said third lens; and
   a second rotation mount mechanically coupled to said fourth lens for rotating said fourth lens along a second axis perpendicular to a focal axis of said fourth lens.

17. The visible light modifier of claim 16, wherein said first rotation mount further rotates said third lens along a third axis perpendicular to both said focal axis of said third lens and said first axis, and wherein said second rotation mount rotates said fourth lens along a fourth axis perpendicular to both said focal axis of said fourth lens and said second axis.

18. The visible light modifier of claim 17, further comprising:

an elliptical mount mechanically coupled to said third lens for moving said third lens along an elliptical path in a plane perpendicular to said focal axis of said third lens; and a second elliptical mount mechanically coupled to said fourth lens for moving said fourth lens along an elliptical path in a plane perpendicular to said focal axis of said fourth lens.

19. The visible light modifier of claim 1, further comprising a tiltable mount for mounting said reflective surface within said container, whereby a direction of said projection beam may be adjusted.

20. A method for generating a visible display, said method comprising:

generating an illumination beam;

directing said illumination through a fluid refractive medium at a reflective surface positioned at a predetermined non-zero angle with respect to an average surface of said refractive medium; and projecting a resulting reflected beam from said reflective surface in a specific direction toward a background to generate a visual display containing spatial variations as a result of motion of said fluid refractive medium.

21. The method of claim 20, wherein said generating generates an illumination beam having a second predetermined non-zero angle with respect to a normal to said reflective surface, whereby an angular separation of light occurs within said fluid refracting medium, and wherein said projecting projects a reflected beam having a varying chromatic pattern as a result of motion of said fluid refractive medium.

22. The method of claim 20, further comprising introducing an image within said illumination, whereby said projecting projects a projection containing said image.

23. The method of claim 20, further comprising altering a profile of said illumination beam continuously using a lens system with a varying focal distance, whereby said angular chromatic separation is further varied by said altering.

24. The method of claim 20, further comprising altering said reflected beam using a lens system by passing said reflected beam through varying thickness of said lens system by rotating said lens system, whereby said projection is further varied by said rotating.

25. The method of claim 20, further comprising altering said reflected beam using a lens system by passing said reflected beam through varying thickness of said lens system by moving said lens system along an elliptical path, whereby said projection is further varied by said moving.

* * * * *